United States Patent
Bowman et al.

(10) Patent No.: US 6,415,606 B1
(45) Date of Patent: Jul. 9, 2002

(54) METHOD AND APPARATUS FOR TURBOCHARGING AN ENGINE OF A LOCOMOTIVE

(75) Inventors: Michael John Bowman, Niskayuna; Gregory James Hampson, Saratoga Springs; Anthony Holmes Furman, Scotia, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/617,968

(22) Filed: Oct. 2, 2000

(51) Int. Cl.$^7$ ................................................. F02B 33/44
(52) U.S. Cl. ............................ 60/608; 60/602; 60/607; 123/565
(58) Field of Search ......................... 60/608, 607, 602; 123/565

(56) References Cited

U.S. PATENT DOCUMENTS

| | | | |
|---|---|---|---|
| 4,745,755 A | * | 5/1988 | Kawamura .................... 60/608 |
| 4,850,193 A | * | 7/1989 | Kawamura .................... 60/608 |
| 4,894,991 A | * | 1/1990 | Kawamura .................... 60/608 |
| 4,901,530 A | | 2/1990 | Kawamura |
| 5,307,632 A | * | 5/1994 | Gottemoller et al. ......... 60/608 |
| 5,406,797 A | | 4/1995 | Kawamura |
| 5,560,208 A | | 10/1996 | Halimi et al. |
| 5,605,045 A | | 2/1997 | Halimi et al. |
| 5,629,567 A | | 5/1997 | Kumar |
| 5,678,407 A | | 10/1997 | Hara |
| 5,771,695 A | | 6/1998 | Halimi |
| 5,771,868 A | | 6/1998 | Khair |
| 5,787,711 A | | 8/1998 | Woolenweber et al. |
| 5,870,894 A | | 2/1999 | Woolenweber et al. |
| 5,887,434 A | * | 3/1999 | Arnell et al. .................. 60/608 |
| 5,906,098 A | | 5/1999 | Woolenweber et al. |

FOREIGN PATENT DOCUMENTS

| | | | |
|---|---|---|---|
| WO | WO91/08388 | 6/1991 | .................. 60/602 |

OTHER PUBLICATIONS

Page, Dorriah L. "Optimization of the Air/Fuel Ratio for Improved Engine Performance and Reduced Emissions," SAE Technical Paper Series 961714, SAE International, pp. 71–78, Aug. 5–8, 1995.

* cited by examiner

Primary Examiner—Thomas Denion
Assistant Examiner—Thai-Ba Trieu
(74) Attorney, Agent, or Firm—Patrick K. Patnode; Christian G. Cabou

(57) ABSTRACT

The method for turbocharging an engine of a locomotive in which the engine is operable at a plurality of discrete operating power levels includes controlling at least one of energy to a motor-assisted turbocharger at a plurality of discrete energy levels and air pressure from the motor-assisted turbocharger to the engine at a plurality of discrete air pressure levels above ambient air pressure based on at least some of the plurality of discrete operating power levels (e.g., low power levels) of the engine. Desirably, the method also includes controlling generation of electrical energy from the motor-assisted turbocharger at some of the plurality of discrete operating power levels (e.g., high power levels) of the engine. Apparatus for turbocharging a diesel engine of a locomotive incorporating the above methods are also disclosed.

38 Claims, 2 Drawing Sheets

METHOD AND APPARATUS FOR TURBOCHARGING AN ENGINE OF A LOCOMOTIVE

BACKGROUND OF INVENTION

This invention relates generally to turbochargers, and more specifically, to motor-assisted turbochargers for locomotives.

Conventionally, turbochargers are operably connected to an internal combustion engine in which exhaust gas from the engine is utilized to increase the pressure of air above ambient to the engine. Typically, the turbocharger includes a shaft, a driving turbine or expander attached at one end of shaft, and a compressor attached to the other end of the shaft. The expander is attached to the engine to receive exhaust gases from the engine and the compressor is attached to an air intake manifold of the engine.

During operation, the expander receives exhaust gas which causes the shaft to rotate, which in turn, causes the compressor to rotate and supply air to the air intake manifold of the engine at an increased pressure, i.e., at a pressure greater than ambient air pressure.

Some turbocharger systems have incorporated a separate electric motor/alternator connected to the shaft to increase the rotational speed of the shaft in a continuous manner relative to and in response to the speed of the engine, to increase the rotational speed of the shaft to overcome "turbo lag" (i.e., the short period of time after increased power demand is first sensed until the rotary compressor driven by the exhaust gas turbine reaches its full power capacity), and also to extract electrical energy from the exhaust gas.

In normal operation, the propulsion system of diesel electric locomotives is typically controlled to establish a balanced steady state condition wherein a diesel engine driven alternator produces, for each discrete position of a throttle handle, a substantially constant amount of electrical power for the traction motors. The throttle typically has eight positions or notches with notch 1 being a low power level and notch 8 being maximum power level.

There is a need for a motor-assisted turbocharger for tailoring the turbocharging of a diesel engine of a diesel electric locomotive to increase engine performance and to provide auxiliary electrical power for auxiliary devices over a range of discrete power levels.

SUMMARY OF INVENTION

The above-mentioned need is met by the present invention which provides, in a first aspect, a method for turbocharging an engine of a locomotive in which the engine is operable at a plurality of discrete operating power levels. The method includes controlling at least one of electrical energy to a motor-assisted turbocharger at a plurality of discrete energy levels and air pressure from the motor-assisted turbocharger to the engine at a plurality of discrete air pressure levels above ambient air pressure based on at least some of the plurality of discrete operating power levels of the engine.

In a second aspect, a method for operating an engine of a locomotive in which the engine is operable at a plurality of discrete operating power levels includes controlling at least one of electrical energy to a motor-assisted turbocharger at a plurality of discrete energy levels and air pressure from the motor-assisted turbocharger to the engine at a plurality of discrete air pressure levels above ambient air pressure based on at least some of the plurality of discrete operating power levels of the engine, and controlling generation of electrical energy from the motor-assisted turbocharger at some of the plurality of discrete operating power levels of the engine.

In a third aspect, an apparatus for turbocharging an engine of a locomotive having a plurality of discrete operating power levels includes a motor-assisted turbocharger for increasing air pressure above ambient air pressure to the engine, and a controller for controlling at least one of electrical energy to a motor-assisted turbocharger at a plurality of discrete energy levels and air pressure from the motor-assisted turbocharger to the engine at a plurality of discrete air pressure levels above ambient air pressure based on at least some of the plurality of discrete operating power levels of the engine.

In a fourth aspect, an apparatus for turbocharging an engine of a locomotive having at a plurality of discrete operating power levels includes a motor-assisted turbocharger for increasing air pressure above ambient air pressure to the engine, and a controller for controlling at least one of electrical energy to a motor-assisted turbocharger at a plurality of discrete energy levels and air pressure from the motor-assisted turbocharger to the engine at a plurality of discrete air pressure levels above ambient air pressure based on at least some of the plurality of discrete operating power levels of the engine, and the controller being operable to control generation of electrical energy from the motor-assisted turbocharger at some of the plurality of discrete operating power levels of the engine.

In another aspect, a portion of a power plant for a locomotive includes a diesel engine and the apparatus as described above for turbocharging the diesel engine.

DETAILED DESCRIPTION

Figure 1:
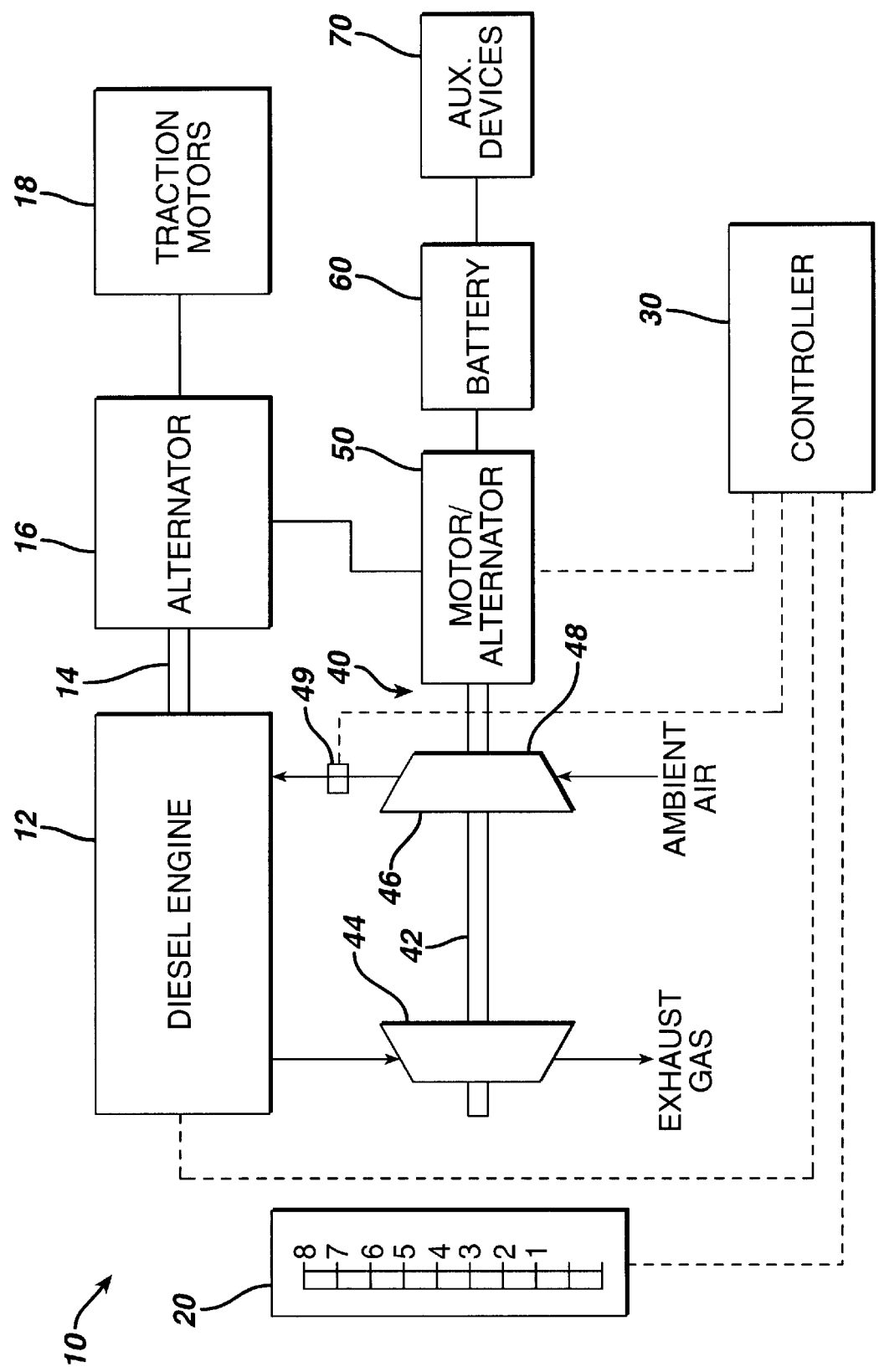
FIG. 1 is a diagrammatic illustration of one embodiment of a power plant system of a diesel electric locomotive incorporating a motor-assisted turbocharger system according to the present invention.

FIG. 1 diagrammatically illustrates a power plant system 10 of a diesel electric locomotive according to one embodiment of the present invention. Power plant system 10 generally includes, for example, a diesel engine 12 having a drive shaft 14 coupled to a generator or alternator 16. Alternator 16 provides electric power to one or more traction motors 18 for propelling the locomotive.

A throttle 20 operably connects to a controller 30 such as the locomotive's elaborate control system for controlling the operation of diesel engine 12. Throttle 20 typically includes eight positions or notches plus idle and shutdown. Notch 1 corresponds to a minimum desired engine speed (power), while notch 8 corresponds to maximum speed and full power. In operation, the propulsion system of the diesel electric locomotive is controlled, e.g., by controller 30, to establish a balanced steady state condition wherein the engine driven alternator produces, for each discrete position of a throttle handle, a substantially constant amount of electrical power for the traction motors.

Figure 2:
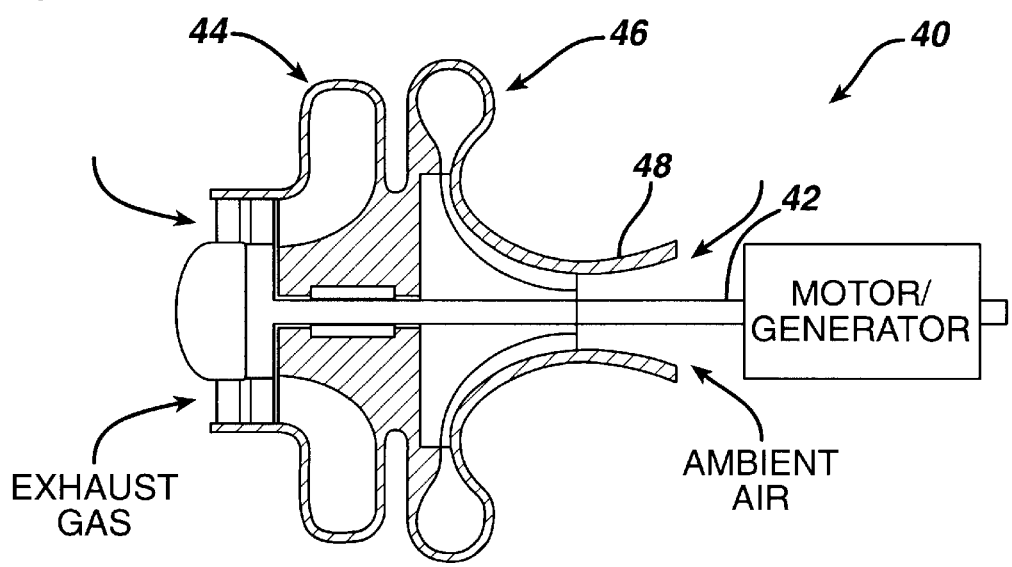
FIG. 2 is an enlarged cross-sectional view of the motor-assisted turbocharger system of FIG. 1.

In this embodiment, power plant system 10 also includes a motor-assisted turbocharger system 40 for increasing the air pressure above ambient air pressure to an intake manifold of diesel engine 12. Motor-assisted turbocharger system 40 includes a single rotatable shaft 42 which is attached at one end to a driving turbine or expander 44 and at the other end to a compressor turbine or compressor 46. Expander 44 is operably connected to an exhaust outlet of diesel engine 12 and compressor 46 is operably connected an air intake of diesel engine 12. A rotary electric machine such as a motor/alternator 50 is attached to shaft 42 adjacent to an inlet side 48 of compressor 46. As best shown in FIG. 2, positioning motor/alternator 50 adjacent to the relatively cool inlet side 45 of compressor 46 reduces the need to thermally insulate motor/alternator 50 from the high temperature expander compared to positioning the motor/alternator between the expander and compressor or to the end of the shaft extending from the expander. With reference again to FIG. 1, motor/alternator 50 is also operably connected to alternator 16 for suppling electrical energy to energize motor/alternator 50 and to a battery 60 for storing electrical energy generated by motor/alternator 50 as described below.

Motor-assisted turbocharger 40 benefits from both low and high engine power operation. For example, the locomotive in the low power region of operation, e.g., notches 1, 2 and 3, controller 30 controls the supply of electrical energy from alternator 16 to motor/alternator 50 to rotate or spin compressor 48 faster than compressor 48 would normally be spun due to the low volume of exhaust gas from diesel engine 12 to expander 44 to provide a generally constant increased level of air pressure above ambient air pressure to diesel engine 12. For each notch position in the lower power regions of operation, motor/alternator 50 is desirably operated in discrete constant modes, e.g., resulting in a constant speed and/or constant increased air pressure level above ambient air pressure for each of the notch levels. Increasing the speed of the rotation of shaft 42 of turbocharger 40 results in an increase in the intake air pressure and mass flow rate to diesel engine 12 thereby reducing emissions such as smoke, unburned hydrocarbons, and carbon monoxide, and improving fuel economy, and increasing engine power output.

Figure 3:
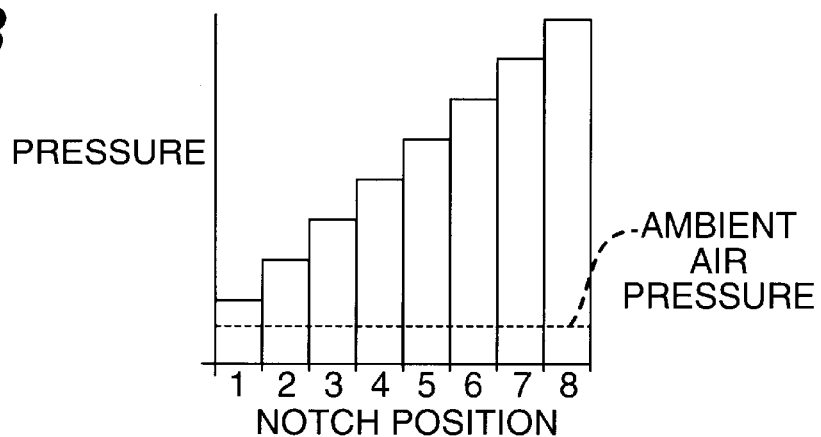
FIG. 3 is a graph of the increased air pressure provided by the turbocharger system of FIG. 1.
Figure 4:
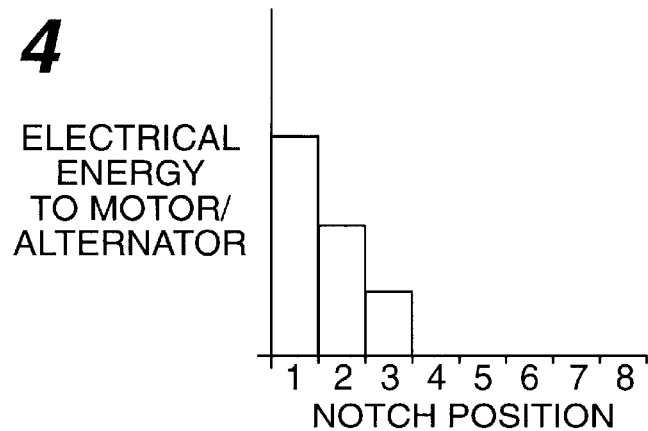
FIG. 4 is a graph of the electrical energy supplied to the motor-assisted turbocharger relative to the notch position of the locomotive power system of FIG. 1.

FIG. 3 graphically illustrates the plurality of discrete generally constant discrete increased air pressure levels above ambient air pressure, e.g., as detected by pressure sensor 49 operably connected to controller 30, for the notch positions of the throttle of the locomotive. FIG. 4 graphically illustrates the relative constant discrete energy levels supplied to motor/alternator 50 for notch positions, idle, 1, 2, and 3. As illustrated in FIG. 4, the amount of electrical energy required to power motor/alternator 50 decreased when going from idle to notch 4.

When increasing the operating power level of the locomotive, e.g., moving throttle 20 from, for example, from idle to notch 1, from notch 1 to notch 2, or from notch 1 to notch 3, motor/alternator 50 can be controllably energized, e.g., by controller 30, until diesel engine 12 reaches equilibrium at the selected notch position. When decreasing the operating power level of the locomotive, e.g., moving throttle 20 from, for example, notch 4 to notch 3, from notch 3 to notch 2, or from notch 3 to notch 1, motor/alternator 50 can be controlled, e.g., by controller 30, to generate power and act as a brake to reduce the likelihood of undesirable surge of the turbocharger compressor, i.e., turbo overspeed.

In the high power region of operation of the locomotive, e.g., notches 5, 6, 7, and 8, the exhaust gas from diesel engine 12 to expander 44 is more than sufficient to power compressor 46 to supply pressurized air to diesel engine 12. In the high power region of operation, motor-assisted turbocharger system 40 is used to extract energy from the exhaust gas, generate electrical energy and desirably maintain discrete increased levels of air pressure above atmospheric air to the engine (see FIG. 3). For example, controller 30 operably controls the operation of motor/alternator 50 to generate electrical power which is supplied to battery 60 and to auxiliary electrical devices 70 of the locomotive, e.g., for use in lighting. The generated electrical energy may also be supplied to the main propulsion system of the locomotive. In addition, in this region of operation the motor/alternator is used to control the speed of the turbocharger and act as a brake as noted above, and to avoid undesirable critical speed ranges, e.g., speed ranges where vibrations get too high, thereby improving fatigue life of various components of the motor-assisted turbocharger system.

In both the low and high power regions of operation of the locomotive, the motor-assisted turbocharger desirably provides an increase in the performance of the diesel engine and a reduction in emissions from the diesel engine. From the present description, it will be appreciated by those skilled in the art that where the combination of expander 44 and compressor 46 alone is insufficient to provide the necessary pressurized air for proper operation of diesel engine 12 at substantially maximum power levels, e.g., at low ambient air pressures such as at high altitudes, controller 30 may control the energizing of motor/alternator 50 to increase the speed of shaft 42 thereby increasing the pressure of air supplied to the air intake of diesel engine 12.

Expander 44 and compressor 46 are desirably compactly configured and designed to supply sufficient pressurized air to the diesel engine at the mid operating power levels without the need for energizing the motor/alternator of the motor-assisted turbocharger. In addition, the diesel engine is desirably compactly designed and requires an increased air pressure above ambient air pressure at the low power levels for optimum performance. While a waste gate is not necessary to avoid overcharging the engine, desirably a safety gate is provided to prevent overcharging of the engine in the event the breaking effect of the motor/alternator is not sufficient to prevent overcharging of the engine.

From the present description, it will also be appreciated by those skilled in the art that while motor/alternator 50 is illustrated as being attached to inlet side 48 of the compressor 46, it will be appreciated that a motor/alternator may be attached or connected between expander and compressor, or to an end of a rotatable shaft extending from the expander.

It will also be appreciated by those skilled in the art that the motor may be a hydraulically operated motor, pneumatically operated motor, or other suitable type of motor for assisting in the rotation or increasing the rotational speed of the exhaust-driven turbocharger shaft. In addition, the rotor of the motor need not be integral with the turbocharger shaft but may instead be connected by mechanical devices such as pulleys and belts, a chain, or a gear set.

Thus, while various embodiments of the present invention have been illustrated and described, it will be appreciated to those skilled in the art that many changes and modifications may be made thereunto without departing from the spirit and scope of the invention.

What is claimed is:

1. A method for turbocharging an engine of a locomotive, the engine operable at a plurality of discrete operating power levels, the method comprising: controlling at least one of electrical energy to a motor-assisted turbocharger at a plurality of discrete energy levels and air pressure from the motor-assisted turbocharger to the engine at a plurality of discrete air pressure levels above ambient air pressure based on at least some of the plurality of discrete operating power levels of the engine.

2. The method of claim 1 wherein the controlling comprises controlling said electrical energy to the motor-assisted turbocharger at a plurality of said discrete energy levels.

3. The method of claim 2 wherein the plurality of discrete energy levels comprise a plurality of generally constant discrete energy levels.

4. The method of claim 1 wherein the controlling comprises controlling said air pressure from the motor-assisted turbocharger to the engine at a plurality of said discrete air pressure levels above ambient air pressure.

5. The method of claim 4 wherein the plurality of said discrete air pressure levels above said ambient air pressure comprise a plurality of said generally constant discrete air pressure levels above said ambient air pressure.

6. The method of claim 1 wherein the controlling is based on a plurality of notch positions of a throttle operably connected to the engine.

7. The method of claim 1 further comprising controlling generation of said electrical energy from the motor-assisted turbocharger at some of the plurality of said discrete operating power levels of the engine.

8. The method of claim 7 further comprising using the generated electrical energy to power an auxiliary device of the locomotive.

9. The method of claim 7 wherein the controlling energy to the motor-assisted turbocharger and said air pressure from the motor-assisted turbocharger to the engine occurs at low operating power levels of the engine and the generation of electrical energy from the motor-assisted turbocharger occurs at high operating power levels of the engine.

10. The method of claim 1 further comprising providing a motor-assisted turbocharger.

11. The method of claim 10 wherein the motor-assisted turbocharger comprises a rotatable shaft, an expander connected to the shaft and connectable to an exhaust of the engine, a compressor connected to the shaft and connectable to an air intake of the engine for increasing the air pressure to the engine, and a motor/alternator attachable to the shaft.

12. The method of claim 11 wherein the motor/alternator is attachable to the shaft adjacent to an inlet side of the compressor.

13. A method for operating an engine of a locomotive, the engine operable at a plurality of discrete operating power levels, the method comprising: controlling at least one of electrical energy to a motor-assisted turbocharger at a plurality of discrete energy levels and air pressure from the motor-assisted turbocharger to the engine at a plurality of discrete air pressure levels above ambient air pressure based on at least some of the plurality of discrete operating power levels of the engine; and controlling generation of electrical energy from the motor-assisted turbocharger at some of the plurality of discrete operating power levels of the engine.

14. The method of claim 13 wherein the controlling comprises controlling said electrical energy to the motor-assisted turbocharger at a plurality of said discrete energy levels.

15. The method of claim 14 wherein the plurality of discrete energy levels comprise a plurality of generally constant discrete energy levels.

16. The method of claim 13 wherein the controlling comprises controlling said air pressure from the motor-assisted turbocharger to the engine at a plurality of said discrete air pressure levels above ambient air pressure.

17. The method of claim 16 wherein the plurality of said discrete air pressure levels above said ambient air pressure comprise a plurality of said generally constant discrete air pressure levels above said ambient air pressure.

18. The method of claim 13 wherein the controlling is based on a plurality of notch positions of a throttle operably connected to the engine.

19. The method of claim 13 further comprising using the generated electrical energy to power an auxiliary device of the locomotive.

20. The method of claim 13 wherein the controlling energy to the motor-assisted turbocharger and said air pressure from the motor-assisted turbocharger to the engine occurs at low operating power levels of the engine and the generation of electrical energy from the motor-assisted turbocharger occurs at high operating power levels of the engine.

21. The method of claim 13 further comprising providing a motor-assisted turbocharger.

22. The method of claim 21 wherein the motor-assisted turbocharger comprises a rotatable shaft, an expander connected to the shaft and connectable to an exhaust of the engine, a compressor connected to the shaft and connectable to an air intake of the engine for increasing the air pressure to the engine, and a motor/alternator attachable to the shaft.

23. The method of claim 22 wherein the motor/alternator is attachable to the shaft adjacent to an inlet side of the compressor.

24. An apparatus for turbocharging an engine of a locomotive, the engine operable at a plurality of discrete operating power levels, said apparatus comprising:
a motor-assisted turbocharger for increasing air pressure above ambient air pressure to the engine; and
a controller for controlling at least one of electrical energy to said motor-assisted turbocharger at a plurality of discrete energy levels and said air pressure from said motor-assisted turbocharger to the engine at a plurality of discrete air pressure levels above ambient air pressure based on at least some of the plurality of said discrete operating power levels of the engine.

25. The apparatus of claim 24 wherein said plurality of discrete energy levels comprise a plurality of generally constant discrete energy levels and said plurality of discrete air pressure levels above said ambient air pressure comprise a plurality of generally constant discrete air pressure levels above said ambient air pressure.

26. The apparatus of claim 24 wherein the controller for controlling said electrical energy to the motor-assisted turbocharger and said air pressure from the motor-assisted turbocharger is based on a plurality of notch positions of a throttle operably connected to the engine.

27. The apparatus of claim 24 wherein said motor-assisted turbocharger comprises a rotatable shaft, an expander connected to said shaft and connectable to an exhaust of the engine, a compressor connected to said shaft and connectable to an air intake of the engine for increasing said air pressure to the engine, and a motor/alternator attachable to said shaft.

28. The apparatus of claim 27 wherein said motor/alternator is attachable to said shaft adjacent to an inlet side of said compressor.

29. The apparatus of claim 24 wherein said controller is operable to control generation of said electrical energy from said motor-assisted turbocharger at some of said plurality of discrete operating power levels of the engine.

30. The apparatus of claim 29 wherein said controller is operable to control said electrical energy to said motor-assisted turbocharger and said air pressure from said motor-assisted turbocharger at low operating power levels of the engine and generation of said electrical energy from said motor-assisted turbocharger at high operating power levels of the engine.

31. An apparatus for turbocharging an engine of a locomotive, the engine operable at a plurality of discrete operating power levels, said apparatus comprising: a motor-assisted turbocharger for increasing air pressure above ambient air pressure to the engine; a controller for controlling at least one of electrical energy to said motor-assisted turbocharger at a plurality of discrete energy levels and air pressure from said motor-assisted turbocharger to the engine at a plurality of discrete air pressure levels above ambient air pressure based on at least some of the plurality of discrete operating power levels of the engine; and said controller is operable to control generation of electrical energy from said motor-assisted turbocharger at some of said plurality of discrete operating power levels of the engine.

32. The apparatus of claim 31 wherein said plurality of discrete energy levels comprise a plurality of generally constant discrete energy levels and said plurality of discrete air pressure levels above ambient air pressure comprise a plurality of generally constant discrete air pressure levels above said ambient air pressure.

33. The apparatus of claim 31 wherein the controller for controlling said electrical energy to the motor-assisted turbocharger and said air pressure from the motor-assisted turbocharger is based on a plurality of notch positions of a throttle operably connected to the engine.

34. The apparatus of claim 31 wherein said motor-assisted turbocharger comprises a rotatable shaft, an expander connected to said shaft and connectable to an exhaust of the engine, a compressor connected to said shaft and connectable to an air intake of the engine for increasing said air pressure to the engine, and a motor/alternator attachable to said shaft.

35. The apparatus of claim 34 wherein said motor/alternator is attachable to said shaft adjacent to an inlet side of said compressor.

36. The apparatus of claim 31 wherein said controller is operable to control said energy to said motor-assisted turbocharger and said air pressure from said motor-assisted turbocharger at low operating power levels of the engine and generation of said electrical energy from said motor-assisted turbocharger at high operating power levels of the engine.

37. A portion of a power plant for a locomotive comprising a diesel engine and an apparatus of claim 24 of turbocharging the diesel engine.

38. A portion of a power plant for a locomotive comprising a diesel engine and an apparatus of claim 31 of turbocharging the diesel engine.

* * * * *